United States Patent
Cole et al.

[15] 3,701,223
[45] Oct. 31, 1972

[54] GLASS REFINISHING APPARATUS

[72] Inventors: Jack Cole, 11646 Cherrylee, El Monte, Calif. 91732; John Robert McIntosh, 13903 Nolandale, Valinda, Calif. 91744

[22] Filed: Feb. 5, 1971

[21] Appl. No.: 112,967

[52] U.S. Cl. ............... 51/241 S, 51/54, 51/170 T, 51/180
[51] Int. Cl. ........ B24b 19/00, B24b 7/02, B24b 7/24
[58] Field of Search .. 51/170 R, 170 T, 241 R, 241 S, 51/258, 283, 126, 119, 177, 180, 54, 55, 56

[56] References Cited

UNITED STATES PATENTS

| | | | |
|---|---|---|---|
| 2,507,052 | 5/1950 | Robinson | 51/180 |
| 2,107,105 | 2/1938 | Criner | 51/177 |
| 1,491,790 | 4/1924 | Cushman | 51/126 |
| 2,452,638 | 11/1948 | Nietfeld | 51/56 |
| 2,801,506 | 8/1957 | Mills | 51/241 S |
| 1,146,705 | 7/1915 | Henry | 51/241 S |
| 2,559,295 | 7/1951 | Grossenbacher | 51/126 |
| 2,422,733 | 6/1947 | Jimerson | 51/170 T |
| 2,166,757 | 7/1939 | Forss | 51/170 T |
| 3,110,993 | 11/1963 | Grage | 51/267 |
| 3,162,066 | 12/1964 | Morey et al. | 125/20 |

Primary Examiner—Donald G. Kelly
Attorney—Jackson & Jones

[57] ABSTRACT

A glass refinishing apparatus is disclosed in which a hydraulically driven buffer is slidably and pivotally guided over the exterior surface of an automobile windshield to produce a smooth and polished finish thereon. The buffer is rotatably mounted on a motor housing that is adapted to be manipulated manually. The motor housing is slidably mounted on a pair of guide rods to enable the buffer to axially traverse along the lengths thereof. The bases of the guide rods are connected to a support arm which in turn is pivotally mounted on a fulcrum. In one embodiment, the fulcrum is adapted to be mounted on the studs located on the automobile which normally support the windshield wipers. This construction enables the buffer to traverse the windshield in an arc similar to the traversal of the windshield wiper. In a second embodiment, the fulcrum is adapted to be mounted on a pair of suction cups in order to be universally mounted on or near any glass surface.

13 Claims, 8 Drawing Figures

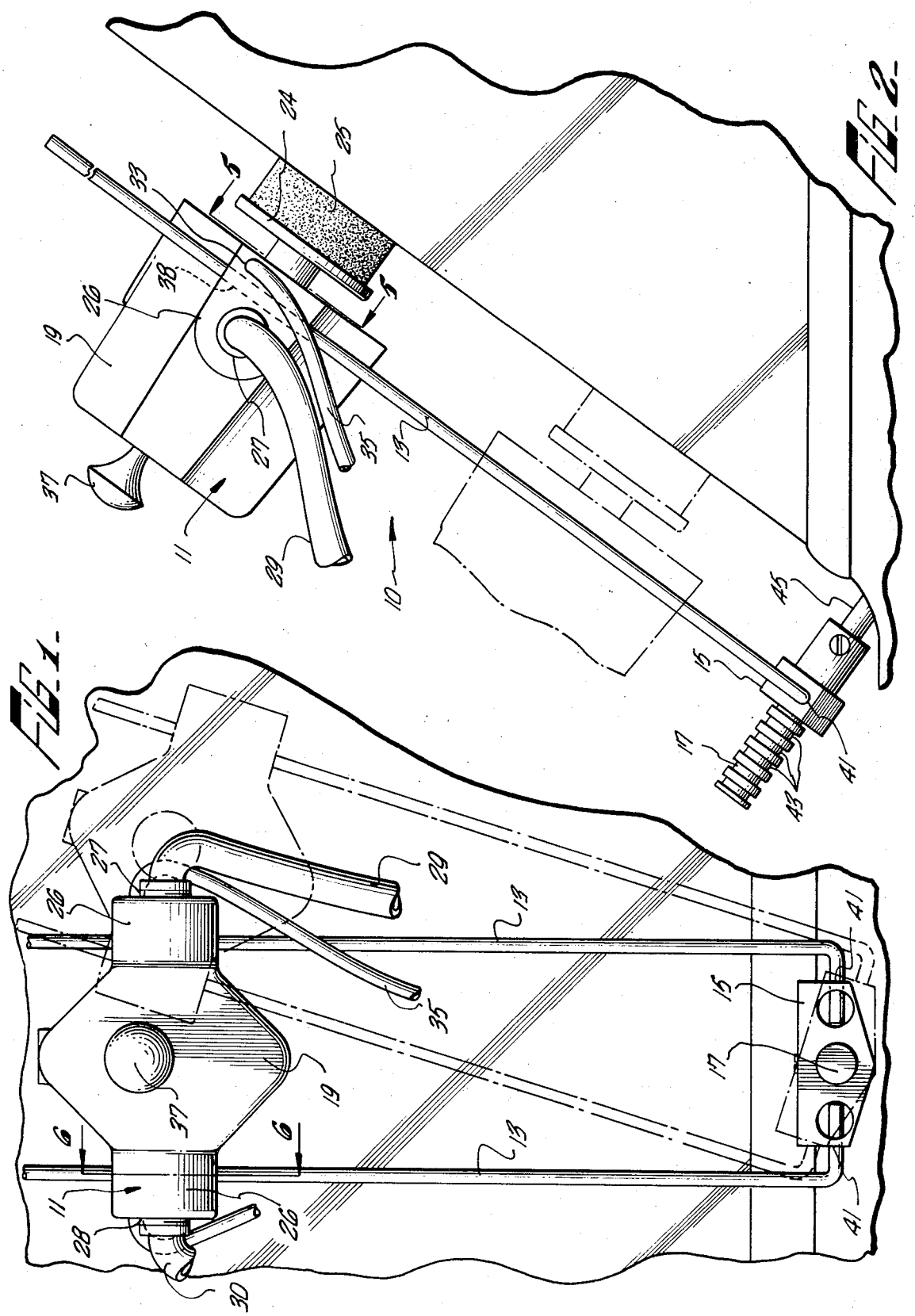

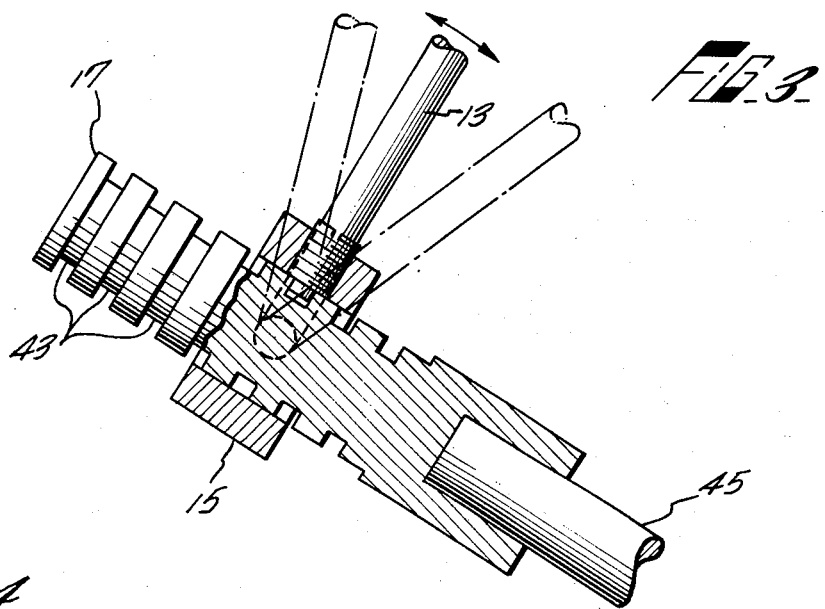
FIG. 3.
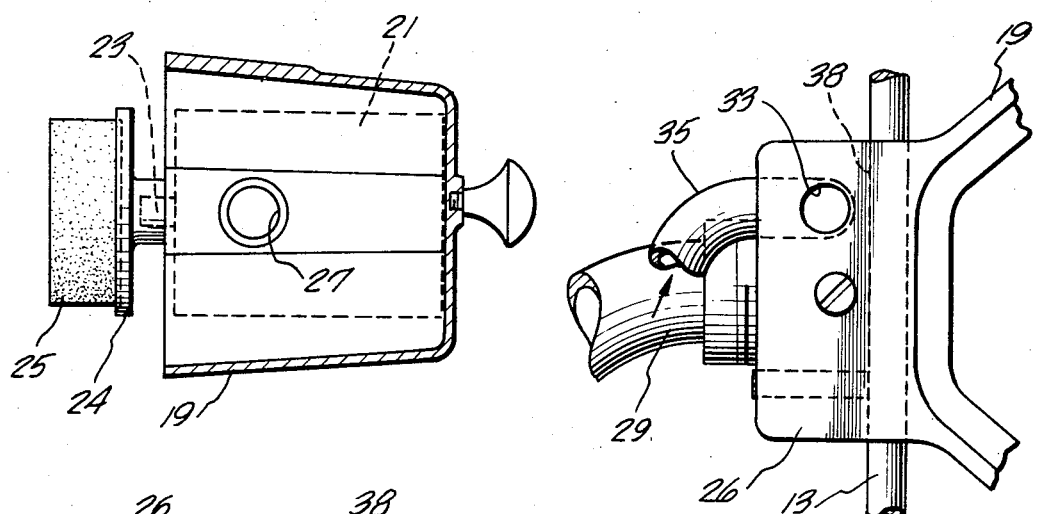
FIG. 4.
FIG. 5.
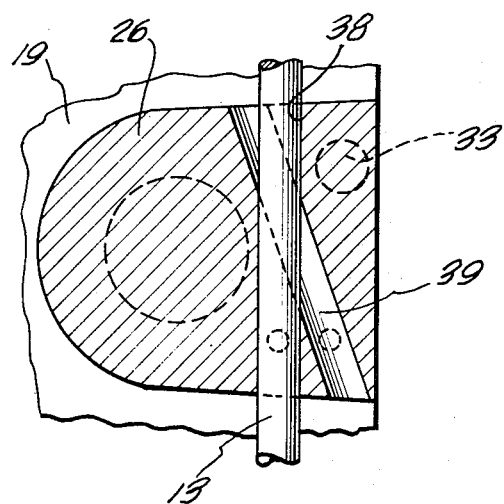
FIG. 6.

GLASS REFINISHING APPARATUS

BACKGROUND OF THE INVENTION

1. Field of the Invention

The present invention relates to an apparatus for refinishing and polishing glass surfaces such as automobile windshields that have become scratched, pitted, or worn.

2. Description of the Prior Art

Glass surfaces such as automobile windshields can be damaged from various causes. The most common type of damage is the scratches caused by worn windshield wipers. Another common type of damage is the pitting caused by severe sandstorms, which are especially prevalent in the western United States. Other nicks and scratches are caused from a myriad of reasons such as flying pebbles and other projectiles.

Normally when such damage occurs, the entire windshield must be replaced. This, of course, is quite expensive since such windshields usually cost over $100.00

Previous attempts have been made to repair such damage by refinishing and polishing the damaged windshield with a hand buffer. However, this system has proven to be unsatisfactory because the hand buffer could not produce a smooth, even finish which is essential on automobile windshields. Such buffers usually created an uneven finish that would cause distortions in the glass that would be detrimental to a driven's vision. Moreover, any attempts to mechanize the buffing process have not met with success because of the expense and complexities involved.

SUMMARY OF THE INVENTION

The present invention obviates the above-mentioned shortcomings by providing a glass surface refinishing apparatus that is simple and economical to operate while still being capable of producing a smooth and constant finish. The apparatus comprises a buffer rotatably driven by a hydraulic motor located within a hand-held motor housing. The motor housing is mounted on a pair of parallel guide rods and is adapted to slide along the rods in an axial direction. The guide rods are mounted at their lower ends to a support arm which in turn is pivotally mounted on a fulcrum. In one embodiment, the fulcrum, comprising a stub shaft, is adapted to be mounted on the studs located on the automobile which normally support the windshield wipers. Because the guide rods pivot, and the motor housing can slide up and down the rods, the buffer, which is carried on the motor housing, is able to traverse over the entire surface of the windshield. Moreover, because the buffer is constrained by the guide rods, a constant pressure can be applied to the buffer to enable the buffer to create a smooth, even finish on the windshield. In the second embodiment, the fulcrum is adapted to be mounted on a pair of suction cups in order to be universally mounted on or near any glass surface.

An important advantage of the present invention is that the buffer can travel in an arc similar to the travel of the windshield wipers. As a result, any scratch damage done by worn wipers can be easily buffeted in the same direction.

The features of the present invention which are believed to be novel are set forth with particularity in the appended claims.

The present invention, both as to its organization and manner of operation, together with further objects and advantages thereof, may best be understood by reference to the following description, taken in connection with the accompanying drawings.

BRIEF DESCRIPTION OF THE DRAWINGS

FIG. 1 is an elevational view of a glass surface refinishing apparatus of the present invention;

FIG. 2 is a side elevational view of the apparatus of the present invention;

FIG. 3 is a fragmentary sectional view of the fulcrum assembly at the base of the apparatus;

FIG. 4 is a sectional view of the motor housing;

FIG. 5 is a fragmentary elevational view of the flanged portion of the motor housing, taken along lines 5—5 of FIG. 2;

FIG. 6 is an enlarged sectional view of the flanged portion of the motor housing;

DESCRIPTION OF THE PREFERRED EMBODIMENTS

Figure 8:
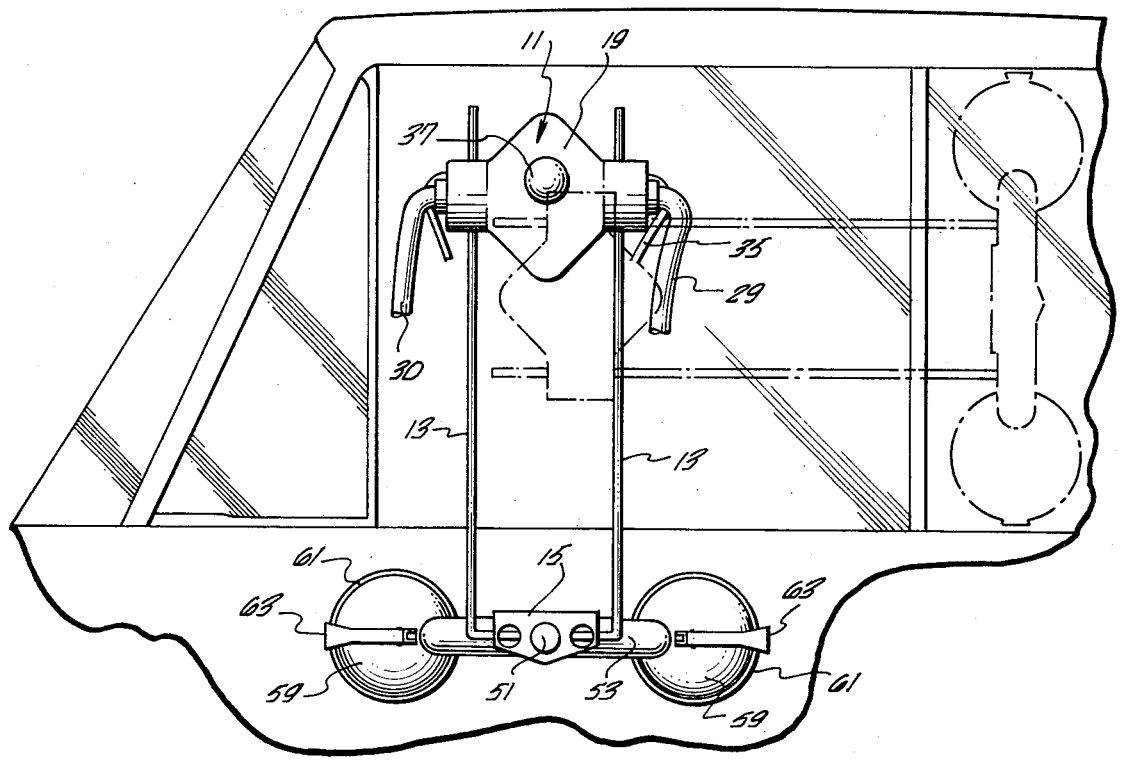
FIG. 8 is an elevational view of the second embodiment of the present invention.

Referring now to the drawings, FIG. 1 shows a glass refinishing apparatus, generally indicated by arrow 10, having a buffer-motor assembly 11 slidably mounted on a pair of guide rods 13. The guide rods 13 are vertically mounted at their lower ends to a support arm 15 which, in turn, is pivotally mounted on a fulcrum 17.

The buffer-motor assembly 11 comprises an open ended motor housing or shell 19 having a motor 21, shown in broken lines, located within the interior thereof. A shaft 23, also shown in broken lines, extends from the motor 21 out of the open end of the motor housing 19 to support a cap 24. A buffer 25 made of any conventional buffing material is mounted on the cap 24 for rotation therewith.

The motor housing 19 further includes a pair of flanged portions 26, each having a radical passageway 27 and 28 respectively formed therein. The passageways 27 and 28 form a hydraulic inlet and exhaust for the motive fluid. A pair of hoses 29 and 30 are respectively connected to the passageways 27 and 28 to provide these passageways with communication to a reservoir and pump system (not shown). The hydraulic motor 21 may be of any conventional type of rotatably driven motor such as a turbine, sliding vane, or axial piston motor.

The flanged portion 26 of the motor housing 19 further comprises a conduit 33 extending therethrough. As shown in FIG. 5, the conduit 33 opens at one end into the open face of the flange with the other end connected to a hose 35. This component functions to provide water to the windshield for lubricating purposes.

A handle 37 is connected to the closed end of the motor housing 19 to aid in the manipulation of the apparatus.

The flanged portions 26 of the motor housing 19 further comprise two pairs of axial passageways 38 and 39 for slidably receiving the pair of guide rods 13. The first pair of passageways 38 are parallel to the open face of the housing 19 to enable the buffer 25 to be parallel to the surface of the windshield, as shown in FIG. 2. However, some windshields are at such an angle that in order for the buffer 25 to be parallel to the windshield, the guide rods must extend through the second pair of passageways 39, which are angularly disposed with respect to the open face of the housing 19.

The lower ends of the guide rods 13 are perpendicularly bent to extend into a pair of openings 41 formed on the outer ends of the support arm 15. The support arm 15, in turn, is adapted to be pivotally mounted on one of the plurality of grooves 43 formed on the fulcrum 17. Two different mounting positions are shown in FIGS. 2 and 3. The lower end of the fulcrum 17 includes a hole drilled therein for permitting the fulcrum to be mounted on a stub shaft 45 which normally functions to pivotally support a windshield wiper. During the refinishing operation the windshield wipers are removed to permit the fulcrum 17 to be mounted thereon.

In utilizing the apparatus 10 on an automobile, the windshield wiper assembly of the automobile is removed from the wiper stub shaft 45 and the fulcrum 17 is mounted thereon. Afterwhich, the support arm 15 is mounted in the desired groove 43 to accommodate the type of windshield being refinished. The guide rods 13 are then secured to the support arm 15. The buffer-motor assembly 11 is then slidably mounted on the guide rods 13. Before the buffing operation, a compound is applied to the windshield. This compound may be of any commercial type. After the compound is applied, motive fluid is applied to the motor 21 to rotatably drive the buffer 25. The motor housing 19 is then manipulated by hand to either slide along the guide rods 13, as shown in the two positions illustrated in FIG. 2, or move in an arc about the fulcrum 17, as shown in the two positions illustrated in FIG. 1. With the combination of these two types of movement, the entire surface of the windshield can be traversed by the buffer 25. During the buffing and polishing operation, the lubricating fluid traveling through hose 35 is ejected through the axial passageways 39 to strike the windshield surface adjacent the buffer. After buffing, a final rinse is applied to the surface of the windshield which is now refinished to a highly polished and smooth surface.

Because of the constraint of the guide rods 13 on the motor housing 19, a constant pressure can be applied to the buffer 25 to enable the buffer to produce a smooth, constant finish on the windshield. It should be noted that the various grooves 43 on the fulcrum 17 enable the support arm 15 to be mounted at various heights. This enables the apparatus to be universally mounted to accommodate any type of windshield.

Figure 7:
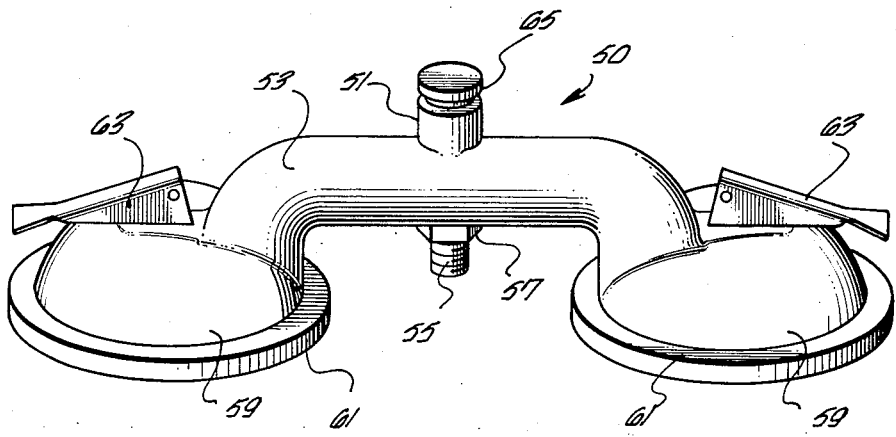
FIG. 7 is a perspective view of a second embodiment of the fulcrum assembly.

FIG. 7 shows a second embodiment 50 of the fulcrum assembly, comprising a fulcrum 51 mounted on a support 53, shaped in the form of a handle for ease of manipulation. The fulcrum 51 extends through the central portion of the support 53 and includes a threaded extremity 55 for receiving a lock nut 57. Each of the extremities of the support 53 is integrally connected to a suction cup 59. Each suction cup 59 operates in a conventional manner and comprises a planar base 61 of a flexible rubber material which extends across the entire bottom surface thereof. The interior central portion of the base 61 located within the cup is connected to a cam assembly (not shown) which is adapted to be raised and lowered by an over-center linkage 63. As is conventional, after the bases 61 are placed on a flat surface, the linkages 63 are pivoted to raise the central portions of the bases 61 to create a suction between the base 61 and the surface it is mounted on.

The fulcrum 51 further includes a groove 65 for receiving the support arm 15. As shown in FIG. 8, the support arm 15 along with the rods 13 and buffer assembly 11 are identical to that shown in the first embodiment. The second embodiment of the buffer assembly is utilized in the applications where a support stud is not available.

As shown in FIG. 8, the assembly is mounted on the side of the automobile to enable the buffer assembly to refinish the side windows thereof. In this location, the fulcrum assembly 50 can either be mounted on the side of the door, as shown in solid lines, or on the rear window, as shown in broken lines, in order to refinish the forward side window. After the unit is mounted, the buffer assembly operates in the same manner as the first embodiment.

This unit can also be utilized for many other applications. For example, in many late model cars the wiper studs are hidden beneath the surface of the hood and as such are inaccessible. For these cars the suction cup assembly must be used. Moreover, the unit can be advantageously used on plate glass windows and showcases for refinishing such surfaces. Because of the wear and, of course, the expense involved on aircraft windows, the present invention is ideal for utilization on such items where no stud is available. As can be seen, the second embodiment of the present invention enables the buffer assembly to be utilized on any glass surface for refinishing purposes.

It should be noted that various modifications can be made to the apparatus while still remaining within the purview of the following claims. For example, a tripod construction may be utilized for supporting the buffer assembly in a manner similar to the second embodiment.

What is claimed is:

1. A glass refinishing apparatus for polishing motor vehicle windows comprising:
    a buffer rotatably mounted on a motor housing; and
    means including a guide rod for guiding said buffer and motor housing over the entire surface of the glass, the housing defining a plurality of passageways for receiving and positioning the guide rod at one of a plurality of selected angles within the housing to maintain the buffer parallel to the surface of the glass.

2. The invention of claim 1 wherein said guide means comprises at least one rod extending into a passageway formed in said motor housing to enable said motor housing to traverse axially along said rod.

3. The invention of claim 2 wherein said rod is pivotally mounted on a fulcrum to enable said buffer and motor housing to travel in an arc over the surface of the glass.

4. The invention of claim 3 wherein said fulcrum further comprises means for connecting said fulcrum to a stub shaft of the windshield wiper assembly of the automobile.

5. The invention of claim 3 wherein said rod is connected to said fulcrum by means of a support arm.

6. The invention of claim 5 wherein said fulcrum further comprises a plurality of support positions located along the length of said fulcrum to enable the support arm to be mounted at various positions.

7. The invention of claim 1 further comprising a hydraulically driven motor located within said motor housing, said motor being drivingly connected to said buffer.

8. The invention of claim 7 wherein said motor housing further comprises inlet and exhaust passageways connected to a source of motive fluid.

9. The invention of claim 1 wherein said motor housing further comprises a pair of passageways each adapted to receive the guide rod, one passageway being parallel to the surface of the buffer while the other is angularly disposed with respect thereto.

10. The invention of claim 1 wherein said motor housing further comprises a second conduit extending therethrough for providing fluid to the surface of the windshield for lubricating purposes.

11. The invention of claim 3 further comprising means for supporting said fulcrum on any planar surface.

12. The invention of claim 11 wherein said support means comprises:
   a support bar supporting said fulcrum; and
   suction means connected to said support bar for attaching said bar to said planar surface.

13. The invention of claim 12 wherein said bar is in the form of a handle and said suction means comprises a suction cup mounted on each extremity of said bar.

* * * * *